(12) United States Patent
Castro et al.

(10) Patent No.: US 6,810,715 B2
(45) Date of Patent: Nov. 2, 2004

(54) IN-SITU LEAK TESTING OF GLOVEBOX, ISOLATOR, OR CONTAINMENT UNIT GLOVES

(75) Inventors: Julio M. Castro, Santa Fe, NM (US); John M. Macdonald, Santa Fe, NM (US); Warren P. Steckle, Jr., Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 79 days.

(21) Appl. No.: 10/357,823

(22) Filed: Feb. 3, 2003

(65) Prior Publication Data

US 2004/0149014 A1 Aug. 5, 2004

(51) Int. Cl.[7] .................................................. G01N 3/04
(52) U.S. Cl. .................................................. 73/40; 73/37
(58) Field of Search .............................. 73/37, 38, 40, 73/49.3, 52

(56) References Cited

U.S. PATENT DOCUMENTS

| | | | | |
|---|---|---|---|---|
| 2,126,434 A | * | 8/1938 | Vosbury | 73/37 |
| 3,603,138 A | * | 9/1971 | Peterson | 73/37 |
| 3,608,354 A | * | 9/1971 | Taylor et al. | 73/37 |
| 3,955,402 A | * | 5/1976 | Harvill | 73/37 |
| 3,991,604 A | * | 11/1976 | Hayes et al. | 73/37 |
| 4,206,631 A | * | 6/1980 | Nysse et al. | 73/40 |
| 4,885,930 A | * | 12/1989 | Werner et al. | 73/37 |
| 5,734,323 A | | 3/1998 | Hermes et al. | 340/540 |
| 6,230,549 B1 | * | 5/2001 | Harris | 73/49.7 |

FOREIGN PATENT DOCUMENTS

FR 2643713 A * 8/1990 ............ G01M/3/02

* cited by examiner

*Primary Examiner*—C D Garber
(74) *Attorney, Agent, or Firm*—Mark N. Fitzgerald

(57) ABSTRACT

A test plug for in-situ testing a glove installed in a glovebox is provided that uses a top plate and a base plate, and a diametrically expandable sealing mechanism fitting between the two plates. The sealing mechanism engages the base plate to diametrically expand when the variable distance between the top plate and the bottom plate is reduced. An inlet valve included on the top plate is used to introducing a pressurized gas to the interior of the glove, and a pressure gauge located on the top plate is used to monitor the interior glove pressure.

2 Claims, 4 Drawing Sheets

IN-SITU LEAK TESTING OF GLOVEBOX, ISOLATOR, OR CONTAINMENT UNIT GLOVES

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to the leak testing and replacement of gloves that are utilized in gloveboxes, isolators, or containment units, and, more particularly, to the in-situ leak testing of gloves installed within these work enclosures.

BACKGROUND OF THE INVENTION

A glovebox, isolator, or containment unit (herein collectively referred to as "glovebox") is a controlled environment work enclosure providing primary containment for the work area within the enclosure. Operations are performed through sealed gloved openings for the protection of the worker, the environment, and/or the product. The enclosure typically utilizes tight-closing doors or air locks, armholes with impervious gloves sealed to the box at the gloveport, and exhaust ventilation to keep the interior of the box at negative or positive pressure relative to the surroundings.

A particular glovebox hazard involves the occurrence of a visually undetectable leak within one or both of the gloves. This breach of the enclosure area can lead to contamination outside or inside the enclosure area. This can be extremely dangerous to the workers using the glovebox when the materials within the glovebox are hazardous to one's health. This situation may also lead to contamination of an expensive product. At the present time, the commonly used method to determine whether the integrity of a glove has been compromised is when materials within the glovebox are detected outside the enclosure or when materials outside the glovebox are detected within.

In order to become more efficient at glovebox, isolator, or containment unit operations, a long felt need has existed to determine if the gloves utilized contain pinhole leaks without first experiencing a failure. The following published applications and patents were located that address this need: [1] Japanese patent application, 56140232 JP, "Defect Checking Method for Installed Glove, Etc." discloses a method of determining defects within a glove by using a light source within the glove box and then inserting a photosensitive device into the installed gloves to detect any fight streaming through defects that may be present, [2] Japanese patent, JP 6-75092/A/, "Rubber Glove Wearing Device", describes a device for checking gloves that entails securing them in an orifice of an enclosure that is then placed at negative pressure to provide the motive force for extending the glove within the enclosure. The pressure within the enclosure is then monitored to determine the presence or absence of glove failures, [3] U.S. Pat. No. 5,734,323, "Puncture Detecting Barrier Materials", uses a process of measuring the conductivity, resistivity, or capacitance between the conductive layers of multi-layer protective gloves to determine if the subject glove has been compromised.

The present invention, an in-situ leak testing plug, utilizes a completely different testing apparatus and methodology, and is based on a glovebox glove changeout plug originally designed at Los Alamos National Laboratory in the 1970's. FIG. 1 is an exploded view of this glove replacement plug. Top plate 10, sealing mechanism 20, and base plate 30 each define a center penetration 40, 50, and 60, through which threaded bolt 70 passes. As handle 80 is turned to engage the threads on threaded bolt 70, the distance between top plate 10 and base plate 30 is reduced, providing pressure on sealing mechanism 20 to diametrically expand from beneath top plate 10 and base plate 30 against a gloveport opening, sandwiching the replacement and defective glove between sealing mechanism 20 and a gloveport. This particular feature of the prior art is beneficial to the present invention, as it allows for insertion of an in-situ leak testing plug without introducing shearing forces that might tear an otherwise perfectly good glove. Top plate 10, sealing mechanism 20, and base plate 30 include one or more penetrations 45, 55, and 65, that allows the air within the glove, that would normally be trapped during a solid plug insertion, to vent out.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a test plug for in-situ testing a glove installed in a glovebox having a top plate with an interior surface that defines a circumferential groove, a base plate spaced apart from the top plate a variable distance, a diametrically expandable sealing mechanism fitting within the top plate circumferential groove and having a sealing exterior surface. The sealing mechanism engages the base plate to diametrically expand when the variable distance between the top plate and the bottom plate is reduced. An inlet valve is located on the top plate for introducing a pressurized gas into the glove, and a pressure gauge on the top plate to monitor the interior glove pressure.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
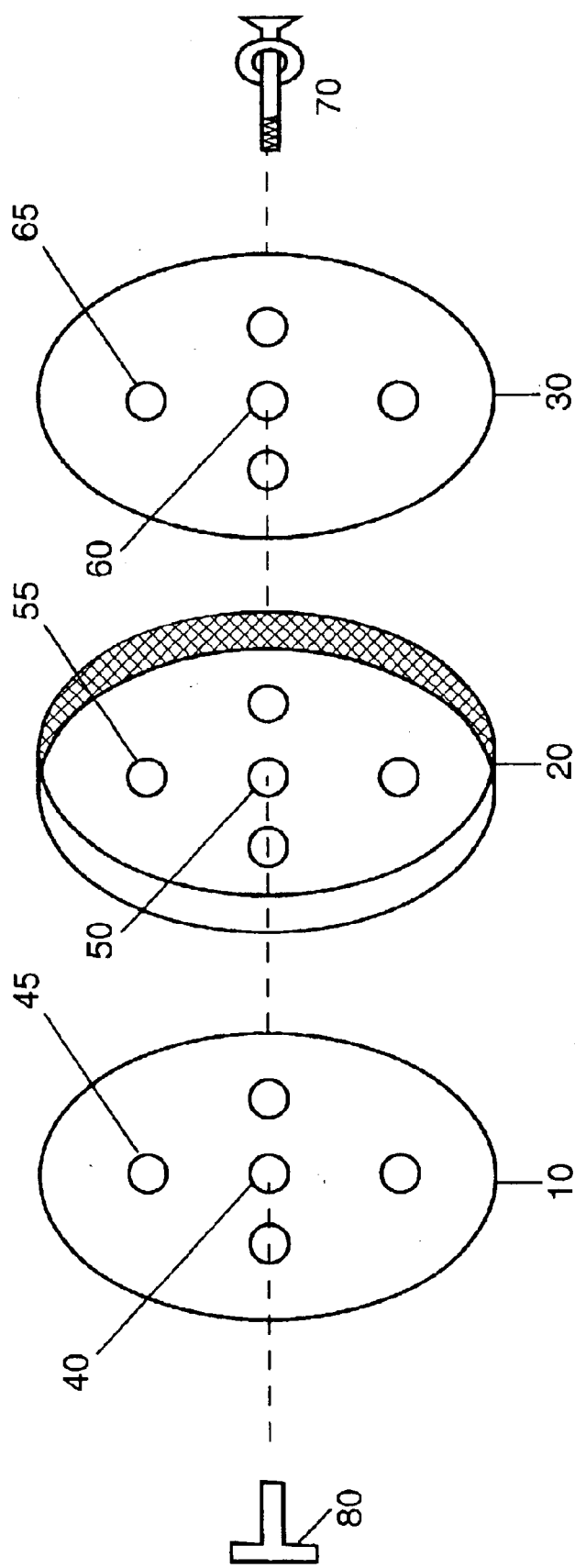
FIG. 1 is an exploded view of a prior art glovebox glove replacement plug.

In accordance with the present invention, an in-situ glove testing plug is installed within a gloveport of a glovebox glove selected for testing in order to isolate the interior of the glove. The method for sealing involves compressing the expandable seal between a top plate and a base plate to force the expandable seal out diametrically into contact with the gloveport. In one embodiment of the present invention, a handle is screwed onto a threaded bolt protruding from the base plate through the expandable sealing mechanism and top plate. As the handle is turned to engage the threads on the bolt, the distance between the top and base plate is reduced, compressing the expandable sealing mechanism and diametrically expanding the seal to expand from beneath the two plates and against the gloveport, sandwiching the glove to be tested between the two surfaces. This sealing method effectively seals the opening without producing any shearing force that could damage the installed glove. Other compression methods may be used, such as a cam or ratcheting device, as long as the effect is to compress the expandable sealing mechanism resulting in an effective seal.

Once the glove to be tested is sealed with the testing plug, a pressurized gas is introduced into the glove. In one embodiment, a flow path is created from a low pressure air pump connected by way of a valve and particulate filter through a penetration located on the top plate of the device. The valve is opened to form a flow path from the pump into the isolated glove interior. The particulate filter prevents release of any possible contaminants once the test is completed. The glove is then pressurized to a typical pressure of 1–2 psig, depending on the glove manufacture, and the valve is closed and pump turned off. A groove that exists on the outside circumference of the top plate facing the diametrically expandable sealing mechanism is used to positively seat the sealing mechanism, preventing the pressurized air from escaping. A pressure gauge is installed in the top plate and registers pressure on the glove side of the glove testing plug. Note the pressure gauge also includes a particulate filter placed between the gauge and the glove interior atmosphere, in order to prevent the gauge itself from becoming contaminated. The pressure gauge is monitored over a selected time period. If pressure within the glove decays, then the glove is determined to be compromised and must be replaced. If the pressure within the glove is maintained over the same period then the glove is determined to be intact.

During testing of the present invention, results were obtained that validated the usefulness of this method of in-situ testing. The test was conducted at a training laboratory. The training coordinators were initially asked to disclose how many of the gloves in their training center were known to be compromised based on their visual inspections of the gloves. They responded that six of the fifty two gloves were known to be compromised. Using the in-situ glove testing plug and the method previously described, it was determined that in actuality 15 of the gloves were in fact compromised.

Figure 2:
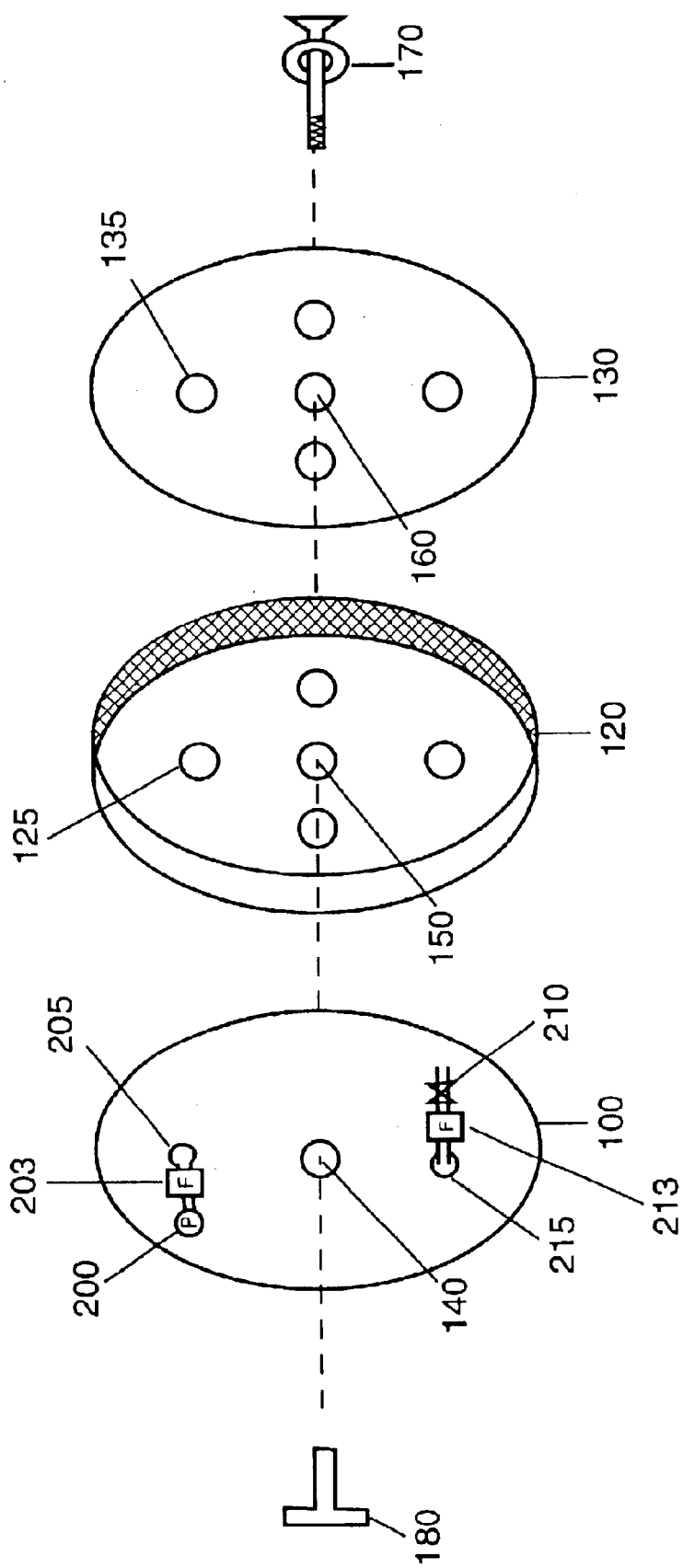
FIG. 2 is an exploded view of an in-situ glovebox glove testing device according to one embodiment of the present invention.

FIG. 2 illustrates an exploded view of a preferred embodiment of the invention. Top plate 100 and base plate 130 are used to sandwich diametrically expandable sealing mechanism 120. Top plate 100, sealing mechanism 120, and base plate 130 each define a center penetration 140, 150, and 160, through which a threaded bolt 170 passes. A handle 180 is screwed onto threaded bolt 170 to hold top plate 100, base plate 130, and sealing mechanism 120 together, and is used during installation in a gloveport to compress sealing mechanism 120. As handle 180 is turned to engage the threads on threaded bolt 170, the distance between top plate 100 and base plate 130 is reduced, providing pressure on sealing mechanism 120 to diametrically expand sealing mechanism 120 from beneath top plate 100 and base plate 130 and against a glovebox opening. Base late 130 and diametrically expandable sealing mechanism 120 include one or more additional penetrations 125, 135 to allow pressure gauge 200 to monitor pressure within the interior of a glove under test.

Inlet valve 210 is attached to penetration 215 in top plate 100 and is used to attach a glove pressurization means, such as a low pressure pump, pressure tank, or the like, that is used to provide a positive pressure. Particulate filter 213 may be placed between the glove interior and inlet valve 210 to prevent any possible contamination from being released after the test is completed. Pressure gauge 200 is attached to another penetration 205 in top plate 100 and registers the pressure on the glove side of top plate 100. Particulate filter 203 is placed between the possibly contaminated glove interior and pressure gauge 200.

Figure 3:
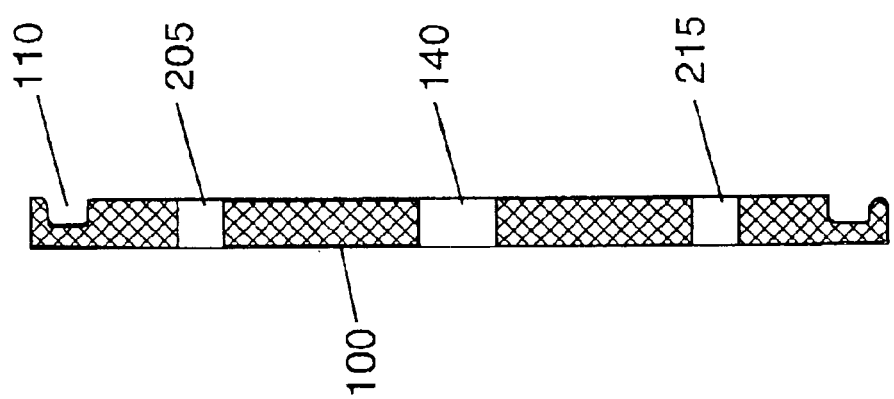
FIG. 3 is a side view of the device top plate shown in FIG. 2.

FIG. 3 illustrates a side cross-sectional view of top plate 100, illustrating groove 110 that exists on the outside circumference of top plate 100, which is used to positively seat diametrically expandable sealing mechanism 200 when the apparatus is assembled. Groove 110 is a necessary improvement over the prior art that allows for a pressure differential to be maintained across the test plug. Penetrations 140, 205, and 215, which were discussed above are also denoted.

Figure 4:
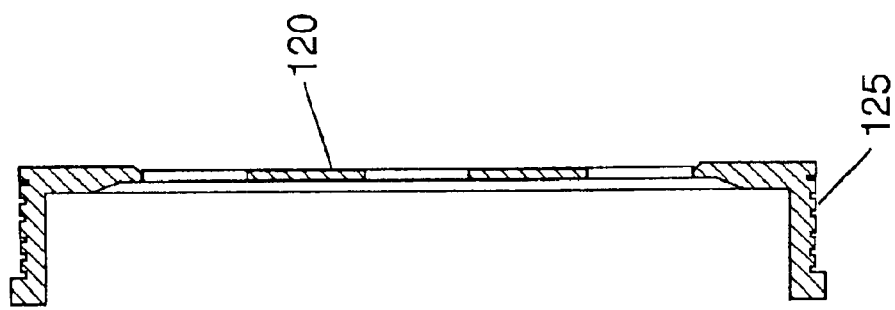
FIG. 4 is a side view of the device diametrically expandable sealing mechanism in FIG. 2.

FIG. 4 illustrates a side cross-sectional view of diametrically expandable sealing mechanism 120. In one embodiment this mechanism is made of neoprene. In order to provide an effective sealing surface; ridges 125 may be formed on the diametrical sealing surface of sealing mechanism 120.

Figure 5:
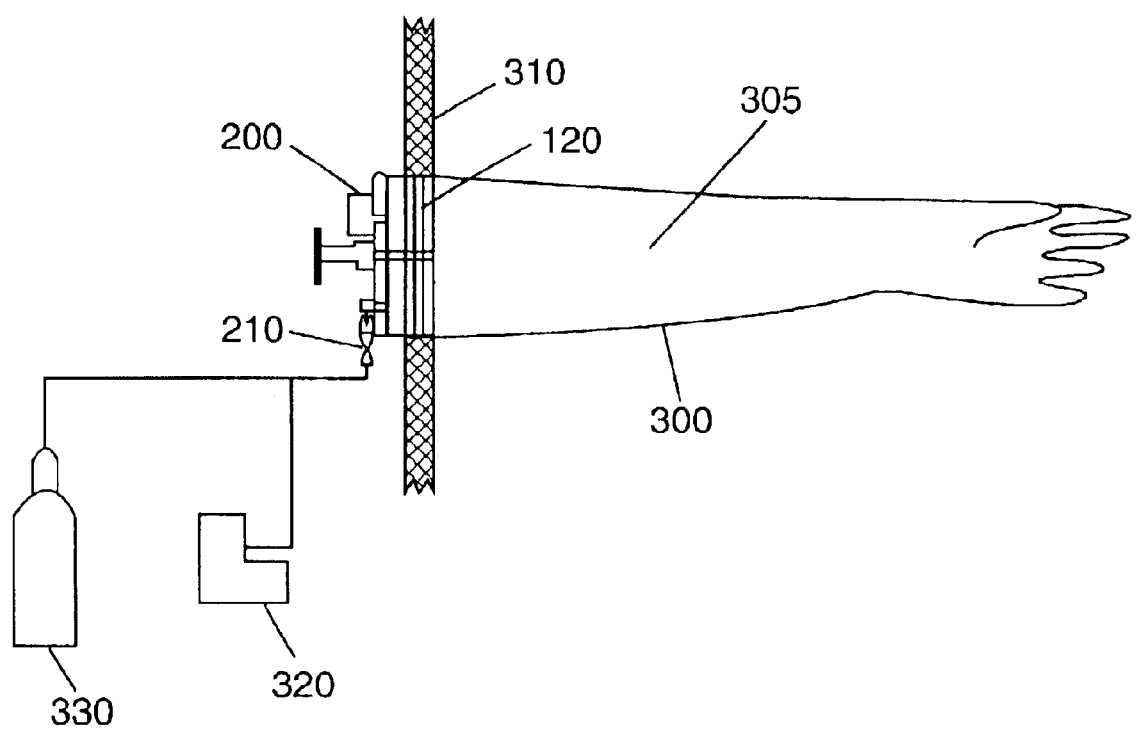
FIG. 5 is a schematic of one embodiment of the in-situ glovebox glove testing device inserted into a glove to be tested.

FIG. 5 pictorially illustrates a side view schematic of a preferred embodiment of the glove testing device installed into glove 300. Sealing mechanism 120 is compressed to diametrically expand and seal against an opening in glovebox 310. A glove pressurization means, such as a low pressure pump 320 or regulated pressure tank 330, is attached to inlet valve 210. Pressure gauge 200 monitors pressure within glove interior 305.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A test plug for in-situ testing a glove installed in a glovebox, comprising:
   a. a top plate having an interior surface that defines a circumferential groove;
   b. a pressure gauge connected to said top plate for monitoring pressure within said glove;
   c. an inlet valve connected to said top plate for introducing a pressurized gas within said glove;
   d. a base plate spaced apart from said top plate a variable distance;
   e. a diametrically expandable sealing mechanism fitting within said circumferential groove of said top plate and having a sealing exterior surface, said sealing mechanism engaging said base plate to diametrically expand said exterior surface when said variable distance between said top plate and said bottom plate is reduced;

f. a plug coupling mechanism engaging said top plate and said bottom plate to vary said variable distance;

g. a first particulate filter attached between said glove interior and said pressure gauge to reduce the possibility of contamination of said pressure gauge; and h. a second particulate filter attached between said glove interior and said inlet valve to prevent:

i. releasing any possible contamination out of said pressurized glove, or ii. introducing any outside contaminates into said glove.

2. The test plug apparatus according to claim 1, wherein, one or more openings are defined by said base plate and said sealing mechanism to enable said pressure gauge to register interior pressure of said glove.

\* \* \* \* \*